United States Patent
Katsuyama

(10) Patent No.: US 10,890,566 B2
(45) Date of Patent: Jan. 12, 2021

(54) AUTOMATIC ANALYSIS CONTROL DEVICE AND PROGRAM

(71) Applicant: SHIMADZU CORPORATION, Kyoto (JP)

(72) Inventor: Yuji Katsuyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 872 days.

(21) Appl. No.: 14/012,427

(22) Filed: Aug. 28, 2013

(65) Prior Publication Data

US 2015/0066388 A1 Mar. 5, 2015

(51) Int. Cl.
*G01N 30/24* (2006.01)
*G01N 30/86* (2006.01)
*G01N 30/88* (2006.01)

(52) U.S. Cl.
CPC ......... *G01N 30/24* (2013.01); *G01N 30/8658* (2013.01); *G01N 30/88* (2013.01); *G01N 2030/8804* (2013.01)

(58) Field of Classification Search
CPC .... G01N 30/24; G01N 30/00; G01N 30/8658; G01N 30/88; G01N 2030/8804
See application file for complete search history.

(56) References Cited

U.S. PATENT DOCUMENTS

| | | | | |
|---|---|---|---|---|
| 6,134,503 A * | 10/2000 | Matsumoto | ........ | G01N 30/8624 702/22 |
| 2007/0272605 A1* | 11/2007 | Lundblad | .............. | G01N 30/82 210/198.2 |
| 2013/0014566 A1* | 1/2013 | Marks | .................... | G01N 30/24 73/61.55 |
| 2013/0295597 A1* | 11/2013 | DeWitte | ................. | G01N 30/06 435/23 |

FOREIGN PATENT DOCUMENTS

JP 2005-127814 A 5/2005

OTHER PUBLICATIONS

Access 2007, Student Edition Complete, 2007, CustomGuide, pp. 1-245.*
IP.com, System for Automating Chromatography Methods Using Improved Radio Frequency Device, pp. 1-7 (Year: 2008).*

* cited by examiner

*Primary Examiner* — Lisa E Peters
(74) *Attorney, Agent, or Firm* — Sughrue Mion, PLLC

(57) ABSTRACT

A control device for automatic analysis including a unit which stores an analysis parameter file in which setting values of multiple setting items related to analytical equipment control are specified; a unit which describes at least identification information for the sample to be analyzed and the analytical parameters file to be used for analysis, for multiple analyses to be executed in the analysis device, and generates an analysis schedule table which describes setting values relating to one or more of the multiple setting items contained in the analytical parameters file for each analysis; and a control unit which controls the operation of the analytical equipment according to the analysis schedule table. The control unit is made such that the setting values specified in the analysis schedule table are applied preferentially for setting items for which the setting value is described in both the analytical parameter file and analysis schedule table.

9 Claims, 5 Drawing Sheets

Figure 1:
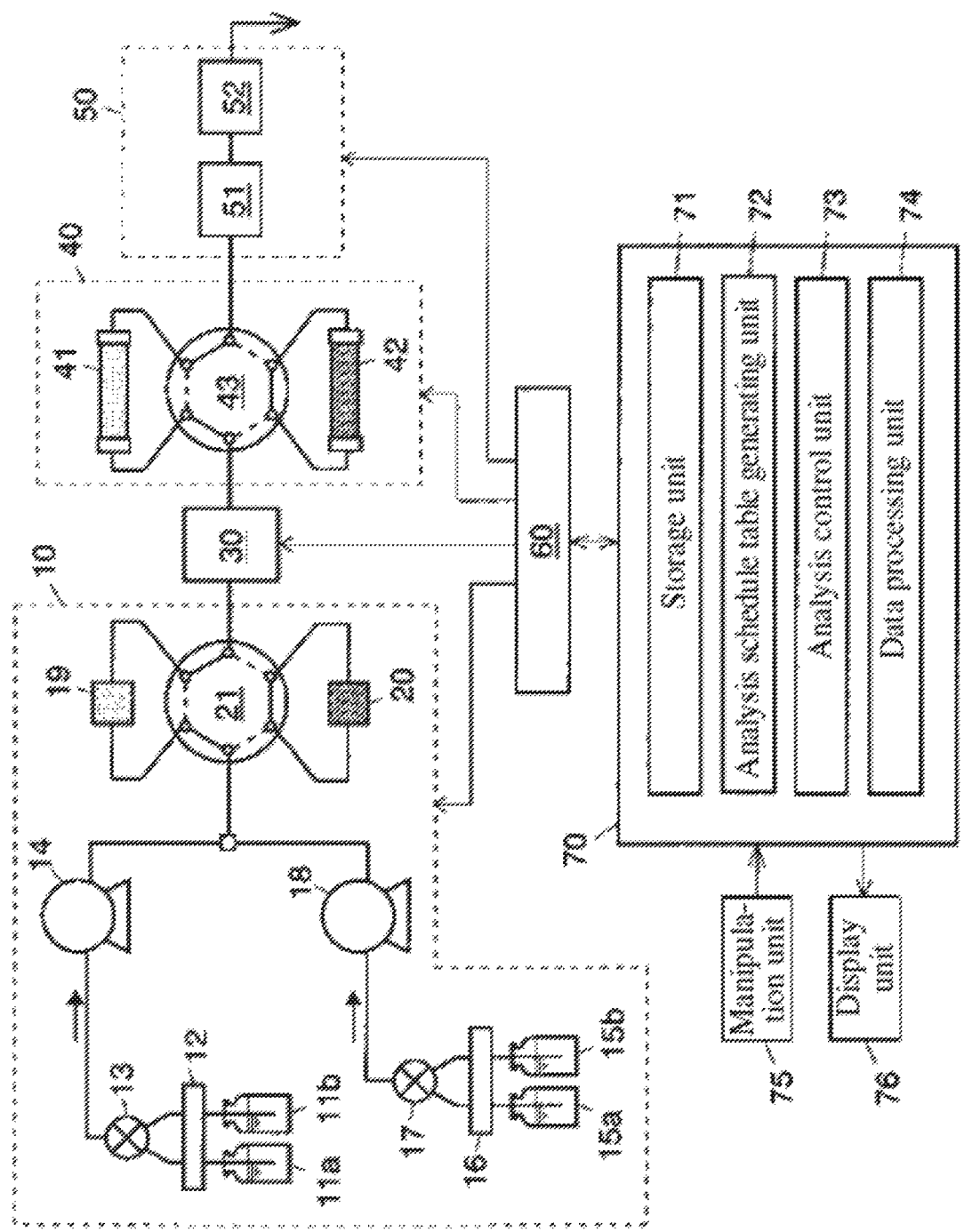

| Vial No. | Sample name | Analytical parameter file name | Column | Eluent A | Eluent B |
|---|---|---|---|---|---|
| 1 | Sample 1 | File 1 | 1 | 1 | 1 |
| 1 | Sample 1 | File 1 | 1 | 1 | 2 |
| 1 | Sample 1 | File 1 | 1 | 2 | 1 |
| 1 | Sample 1 | File 1 | 1 | 2 | 2 |
| 1 | Sample 1 | File 1 | 2 | 1 | 1 |
| 1 | Sample 1 | File 1 | 2 | 2 | 2 |
| 1 | Sample 1 | File 1 | 2 | 2 | 1 |
| 2 | Sample 2 | File 1 | 1 | 1 | 2 |
| 2 | Sample 2 | File 1 | 1 | 1 | 1 |
| ... | ... | ... | ... | ... | ... |

FIG. 2

| Vial No. | Sample name | Analytical parameter file name |
|---|---|---|
| 1 | Sample 1 | File 1 |
| 1 | Sample 1 | File 2 |
| 1 | Sample 1 | File 3 |
| 1 | Sample 1 | File 4 |
| 1 | Sample 1 | File 5 |
| 1 | Sample 1 | File 6 |
| 1 | Sample 1 | File 7 |
| 1 | Sample 1 | File 8 |
| 2 | Sample 2 | File 1 |
| 2 | Sample 2 | File 2 |
| ... | ... | ... |

FIG. 5

AUTOMATIC ANALYSIS CONTROL DEVICE AND PROGRAM

TECHNICAL FIELD

The present invention relates to a control device and program which control the operation of analytical equipment such as liquid chromatographs and gas chromatographs, and more specifically relates to a control device and program for automatic analysis equipment which successively executes analyses while automatically replacing and selecting the sample.

BACKGROUND ART

For example, a liquid chromatograph consists of multiple units, such as an autosampler, pump and column oven, and the operation of each unit is controlled according to control signals from a control device. In such a liquid chromatograph, multiple sample containers (vials) containing a liquid sample are set in advance in an autosampler rack, and the operator inputs and sets an analysis schedule table specifying the analysis sequence, analytical parameters, etc. of the samples into the control device and instructs the initiation of analysis. Thereupon, sample containers are successively selected according to the analysis schedule table, and analysis is automatically executed under the designated analytical parameters (for example, see Patent literature 1).

FIG. 5 is an example of an analysis schedule table in liquid chromatography analysis. In this table, one row corresponds to one analysis, and information necessary for executing the analysis, such as the vial number, sample name, analytical parameter file name, etc., is described in each row. Here, analytical parameter file refers to a file specifying the details of the analysis, i.e. various analytical parameters to be applied to the analysis, which is prepared in advance by the operator and stored in the control device.

PRIOR ART LITERATURES (Patent literature 1) Japanese Unexamined Patent Application Publication 2005-127814

In liquid chromatographic analysis, there are cases where multiple analyses will be carried out on the same sample, changing only the eluent or column type, such as when investigating the optimal analytical parameters for a given sample. Conventionally, when performing this sort of analysis, the operator would generate multiple analytical parameter files in which only the type of eluent and/or column is different and register them with the control device, designate the same sample on multiple rows of the analysis schedule table, as shown in FIG. 5, and designate an analytical parameter file name in each of the multiple rows. Thus, the operation was laborious for the operator and the work efficiency was poor. Furthermore, when designating an analytical parameter file name in each row of the analysis schedule table, there is the possibility that the incorrect file will be designated.

The present invention was made to resolve the aforesaid problem, its object being to provide a control device for automatic analysis which makes it possible to efficiently perform generation of analytical parameter files and analysis schedule tables when performing multiple analyses on automatic analytical equipment in which only a portion of the analytical parameters differs.

SUMMARY OF THE INVENTION

The control device for automatic analysis according to the present invention, made to resolve the aforementioned problem, is a control device for automatic analysis which causes analytical equipment to successively execute multiple analyses by controlling the operation of the analytical equipment according to a preset analysis schedule table, including a) an analytical parameter file storage means which stores an analytical parameter file which specifies the setting value for multiple setting items relating to analytical equipment control;

b) an analysis schedule table generating means which generates an analysis schedule table which describes at least identification information for the sample to be analyzed for each of said multiple analyses, and describes setting values relating to one or multiple setting items among the multiple setting items contained in said analytical parameter file for at least one of said multiple analyses; and c) an analysis control means which controls the operation of said analytical equipment according to said analysis schedule table, wherein said analysis control means, in each of said multiple analyses, for those of said multiple setting items for which the setting value has been described in the analysis schedule table, applies that setting value to the analysis, and for those of said multiple setting items for which the setting value has not been described in the analysis schedule table, applies the setting value specified in said analytical parameter file to the analysis.

Furthermore, in the control device for automatic analysis according to the present invention described above, it is preferable if the analysis schedule table generated by said analysis schedule table generating means additionally describes the analytical parameter file to be used for analysis for each of the aforesaid multiple analyses, and said analysis control means, in each of said multiple analyses, for those of said multiple setting items for which the setting value has been described in the analysis schedule table, applies that setting value to the analysis, and for those of said multiple setting items for which the setting value has not been described in the analysis schedule table, applies to the analysis the setting value which has been specified in the analytical parameter file described in the analysis schedule table as the one to be applied to that analysis.

It is also preferable if the control device for automatic analysis additionally includes d) a setting value candidate acquisition means which acquires one or more selectable setting values for one or multiple setting items which are to be described in said analysis schedule table from among said plurality of setting items, wherein said analysis schedule table generating means automatically generates an analysis schedule table which covers all combinations of setting value candidates acquired by said setting value candidate acquisition means.

Furthermore, it is preferable if, in the control device for automatic analysis according to the present invention described above, said analytical equipment is a chromatograph, and one or multiple setting items to be described in said analysis schedule table from among said plurality of setting items is at least one of either the mobile phase (i.e. the eluent or carrier gas) type or the column type.

The program according to the present invention made to resolve the aforementioned problem is a program used in a computer for causing analytical equipment to successively perform multiple analyses by controlling the operation of the analytical equipment according to a preset analysis schedule, which causes the computer to function as a) an analytical parameter file storage means which stores an analytical parameter file which specifies the setting value for multiple setting items relating to analytical equipment control;
b) an analysis schedule table generating means which generates an analysis schedule table which describes at least identification information for the sample to be analyzed for each of said multiple analyses, and describes setting values relating to one or multiple setting items among the multiple setting items contained in said analytical parameter file for at least one of said multiple analyses; and
c) an analysis control means which controls the operation of said analytical equipment according to said analysis schedule table,
wherein said analysis control means, in each of said multiple analyses, for those of said multiple setting items for which the setting value has been described in the analysis schedule table, applies that setting value to the analysis, and for those of said multiple setting items for which the setting value has not been described in the analysis schedule table, applies the setting value specified in said analytical parameter file to the analysis.

Effect of the invention

According to the control device and program for automatic analysis according to the present invention having a configuration as above, it is possible to describe setting values also in the analysis schedule table for some of the setting items contained in the analytical parameter file (for example, the column type and the mobile phase type), and in each analysis specified in the analysis schedule table, the setting value specified in the analysis schedule table is applied preferentially for the setting items for which a setting value is described in both the analytical parameter file and the analysis schedule table. Therefore, for example, in cases where multiple analyses are conducted for which only the column and mobile phase type is changed and other analytical parameters are kept the same, there is no need to generate different analytical parameter files for each column and mobile phase combination as in the prior art. Thus, it becomes possible to reduce the operator effort required for analytical parameter file generation and to prevent the designation of incorrect analytical parameter files in the analysis schedule table by the operator.

BRIEF DESCRIPTION OF THE DRAWINGS (FIG. 1) A simplified diagram of a liquid chromatograph comprising a control device according to an example of embodiment of the present invention.

(FIG. 2) A drawing showing an analysis schedule table in the same example of embodiment.

(FIG. 3) A flow chart intended to explain the operation of a control device according to the same example of embodiment.

(FIG. 4) A simplified diagram of a liquid chromatograph comprising a control device according to another example of embodiment of the present invention.

(FIG. 5) A drawing showing an analysis schedule table in the prior art.

DETAILED DESCRIPTION OF THE EXEMPLARY EMBODIMENTS

An example of embodiment of a control device for automatic analysis according to the present invention will be described with reference to the drawings. FIG. 1 is a simplified diagram of a liquid chromatograph comprising a control device according to the present example of embodiment.

This liquid chromatograph includes a liquid feed unit 10, an autosampler 30, a column oven 40, a detection unit 50, a system controller 60 which controls these units, a control device 70 which manages analysis operations through system controller 60 and analyzes and processes data obtained by detection unit 50, a manipulation unit 75 comprising a keyboard and mouse connected to control device 70, a display unit 76 comprising a display, etc. Liquid feed unit 10 mixes eluent A, suctioned by liquid feed pump 14, and eluent B, suctioned by liquid feed pump 18, by means of general purpose analytical gradient mixer 19 or ultra high speed analytical gradient mixer 20 and then feeds them to the column, and includes a channel switching valve 21 for selectively interposing one of said two gradient mixers 19 and 20 into the eluent channel. Furthermore, two eluent containers are connected to liquid feed pumps 14 and 18 via eluent switching valves 13 and 17 and degassers 12 and 16 respectively. One of two eluent containers 11a, 11b is selected by switching the eluent switching valve 13, and eluent inside the corresponding container is suctioned by liquid feed pump 14 as aforesaid eluent A. Furthermore, one of two eluent containers 15a, 15b is similarly selected by switching of eluent switching valve 17, and the eluent in the corresponding container is suctioned by liquid feed pump 18 as aforementioned eluent B. The column oven contains a general purpose analytical column 41, an ultra high speed analytical column 42 and a channel switching valve 43 for selectively connecting one of these columns to the eluent channel. Therefore, there are (eluent A: 2 types)×(eluent B: 2 types)×(column: 2 types), or a total of eight combinations of eluent and column available for analysis in the liquid chromatograph of the present example of embodiment.

Control device 70 contains, as function blocks, a storage unit 71, an analysis schedule table generating unit 72, an analysis control unit 73 and a data processing unit 74. The substance of control device 70 is a personal computer, wherein the various functions as described below are achieved by executing specialized control/processing software installed on the personal computer.

The standard analysis operation of a single analysis is as follows. Namely, under control of system controller 60, which has received an instruction from analysis control unit 73 of control device 70, eluent switching valves 13 and 17 each select one eluent container, and liquid feed pumps 14 and 18 suction eluent at a predetermined flow rate from the eluent containers. Eluent A suctioned by liquid feed pump 14 and eluent B suctioned by liquid feed pump 18 are uniformly mixed by general purpose analytical gradient mixer 19 or ultra high speed analytical gradient mixer 20, and the eluent after mixing flows into the column via autosampler 30. A rack into which one or more sample bottles (vials) have been loaded is placed into the autosampler 30, a predetermined sample is selected and sampled under control of system controller 60, and that sample is injected into the eluent at a predetermined timing. This sample is carried by the eluent and introduced into general purpose analytical column 41 or high speed analytical column 42. While passing through the column, the components in the sample are eluted in temporally separated fashion and introduced into detection unit 50, the components are successively detected by PDA detector 51 and mass spectrometer 52 provided in detection unit 50, and a detection signal corresponding to the concentrations of the components is digitized and the resulting data is sent via system controller 60 to control device 70. In the control device 70, the received data is stored in storage unit 71, provided on a storage device such as a hard disc, and in data processing unit 74, predetermined processing is performed to generate a chromatogram, which is displayed on the screen of display unit 76.

In order to sequentially analyze samples loaded into the rack of autosampler 30, prior to the analysis, the operator needs to generate an analysis schedule table by manipulating the manipulation unit 75. FIG. 2 is an example of an analysis schedule table in the present example of embodiment. Each row in the analysis schedule table corresponds to one analysis, and each column corresponds to a setting item. The setting items in the analysis schedule table of the present example, in order from the left in the drawing, are vial number (corresponding to identification information of the sample to be analyzed in the present invention), sample name, analytical parameter file, column type, eluent A type and eluent B type.

The analytical parameter file is a file describing the details of LC analysis, i.e. the various operating parameters of the liquid feed unit 10, autosampler 30, column oven 40 and detection unit 50, which specifies predetermined setting values for each of the various setting items necessary for execution of analysis, for example, the types and mixing ratio of eluents A and B to be fed by the liquid feed unit 10, the sample injection parameters for the autosampler 30, the temperature profile of the column oven 40 and the type of column used for analysis. Such an analytical parameter file is generated in advance by the operator for each set of analysis parameters, and is given a predetermined file name (file 1, file 2, etc.) and stored in storage unit 71.

When an analysis schedule table is to be generated, analysis schedule table generating unit 72 causes an analysis schedule table be displayed on the screen of display unit 76 in response to operator instructions from manipulation unit 75, and receives input from manipulation unit 75. The operator then uses the manipulation unit 75 to input the setting values for the various setting items in each row of the analysis schedule table, i.e. the vial number, sample name, analytical parameter file name, column type, eluent A type and eluent B type to be used for the analysis of each row. Here, the operator may directly input the setting values into cells of the analysis schedule table, or a pull-down menu may be provided in each cell, whereby the operator would select the appropriate setting value from the setting values displayed in the pull-down menu. It will be noted that, among the aforementioned setting items, a setting value is specified also in the analytical parameter file for the column, eluent A and eluent B, so unless one wishes to apply different values to the analysis than the setting values in the analytical parameter file designated in each row, there is no need to input setting values for these setting items in the analysis schedule table.

FIG. 2 is an example of an analysis schedule table generated for a case where multiple analyses in which only the column and eluents A and B are changed and the other analytical parameters are kept the same are to be conducted on the same sample. In the first through eighth rows in this example, among the setting items, the setting values for vial number, sample name and analytical parameter file name are the same in each row, while the combination of setting values for column, eluent A and eluent B differ from row to row. It will be noted that in the analysis schedule table of FIG. 2, a column setting value of "1" signifies that general purpose analytical column 41 is to be used, while a column setting value of "2" signifies that ultra high speed column 42 is to be used. Furthermore, setting values "1" and "2" for eluent A signify using the eluent of eluent containers 11a and 11b respectively, and setting values "1" and "2" of eluent B signify using eluents of eluent containers 15a and 15b respectively. While numerals are used here as setting values, it will be noted that the setting values in the present invention are not limited thereto, and may also be character strings, such as a column name, eluent name, etc.

Figure 3:
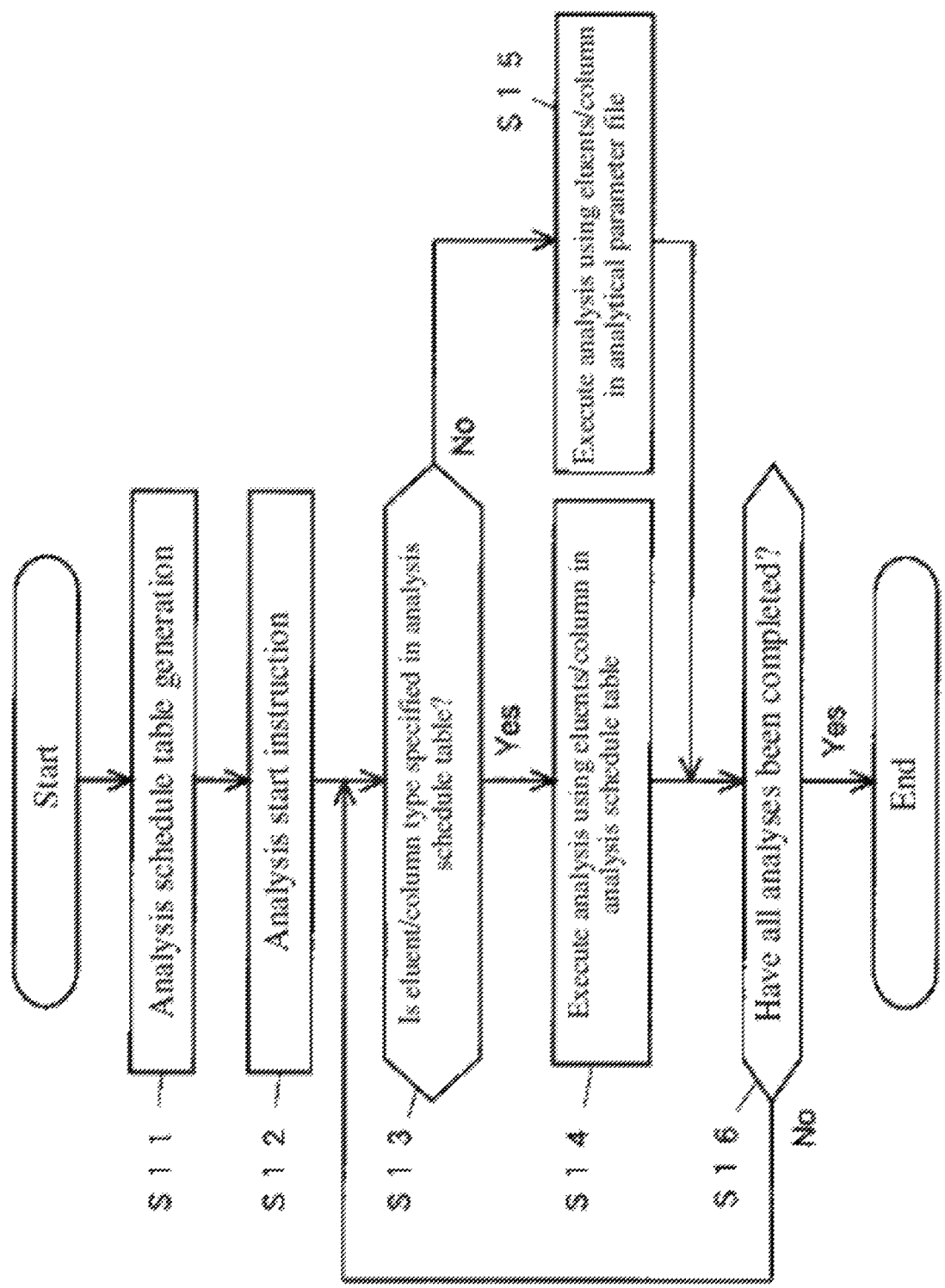

The operation during consecutive analysis by the liquid chromatograph of the present example of embodiment will be explained while referring to the flow chart of FIG. 3. First, the operator uses the manipulation unit 75 to generate an analysis schedule table and stores it in storage unit 71 (step S11), and further issues an instruction to initiate consecutive analysis to the control device 70 from the manipulation unit 75 (step S12). Thereupon, analysis control unit 73 reads information specified in the first row of the analysis schedule table from storage unit 71, and checks if setting values for column, eluent A and eluent B have been specified in that row (step S13). If these setting values have been specified in the analysis schedule table (Yes in step S13), the setting value in the analysis schedule table is applied to the analysis of that row and the analysis is executed (step S14). Here, the analysis control unit 73 applies setting values of the aforementioned analysis schedule table with respect to the column, eluent A and eluent B types, and performs operational control of the various units according to the description in the analytical parameter file designated in the analysis schedule table with respect to other analytical parameters (setting items). For example, in the case of the analysis schedule table shown in FIG. 2, for the analysis of row 1, the operation of eluent switching valves 13 and 17 and channel switching valves 21 and 43 is controlled so as to use general purpose analytical column 41 as the column, the eluent of eluent container 11a as eluent A and the eluent of eluent container 15a as eluent B, and with respect to other analytical parameters, the various units are instructed to perform operations according to the description in the analytical parameter file designated in the analysis schedule table (i.e. "file 1"). It will be noted that if only the setting values for a portion of the column, eluent A and eluent B items in the analysis schedule table (for example, the column type only) have been specified in the analysis schedule table, for those values, the setting values in the analysis schedule table are applied to the analysis, and for the rest (e.g. the type of eluent A and eluent B), the setting values specified in the analytical parameter file are applied to the analysis.

Furthermore, in step S13, if column, solution A and solution B setting values have not been specified in the analysis schedule table (No in step S13), analysis control unit 73 directly uses the description in the analytical parameter file designated in the analysis schedule table (i.e. "file 1") to perform operational control of the various units (step S15).

When one analysis has been completed, analysis control unit 73 determines whether or not all the analyses stipulated in the analysis schedule table have been completed (step S16), and if they have not been completed (No in step S16), the flow returns to step S13 and the processing of steps S13 through S16 is repeatedly executed until the result in step S16 is Yes.

In control device 70 according to the present example of embodiment as described above, the type of column, eluent A and eluent B can be specified in the analysis schedule table, so in cases where multiple analyses are performed in which only the type of column and eluents A and B is changed and the other analytical parameters are kept the same, there is no need to generate a different analytical parameter file for each combination of column and eluents as in the prior art. Thus, operator effort required for generating analytical parameter files can be reduced, and the operator can be prevented from designating an incorrect analytical parameter file in the analysis schedule table.

Figure 4:
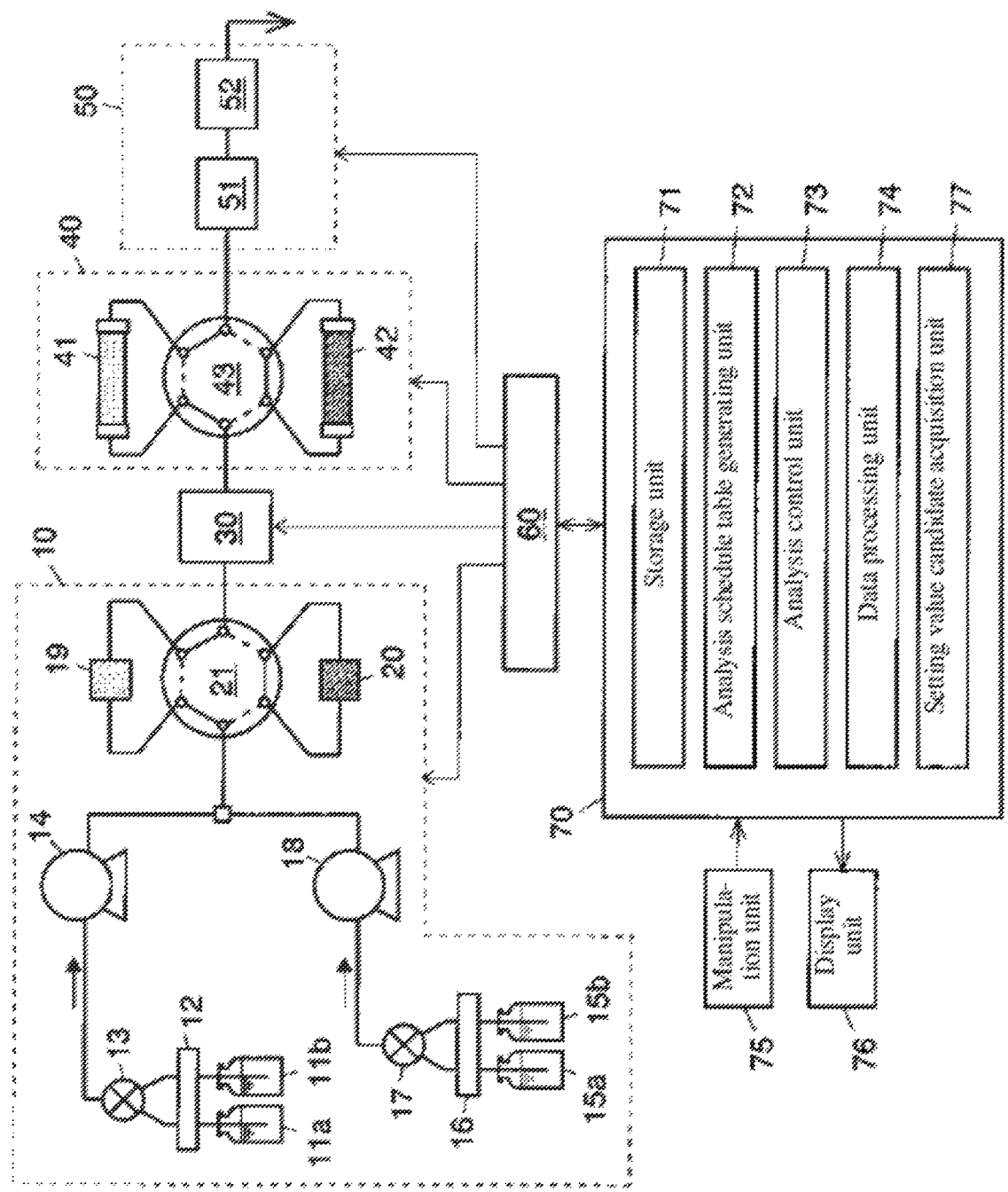

It will be noted that an example where the operator uses the manipulation unit 75 to manually input various setting values in the analysis schedule table was described, but a configuration many also be employed wherein analysis schedule table generating unit 72 automatically generates an analysis schedule table as shown in FIG. 2, which covers all combinations of setting value candidates, based on the multiple selectable setting values (i.e. setting value candidates) for column, eluent A and eluent B. It is thereby possible to increase the efficiency of analysis schedule table generation. In this case, the operator may also be allowed to input the aforementioned multiple setting values selectable for column, eluent A and eluent B via the manipulation unit 75, but it is preferable to employ a configuration as shown in FIG. 4, wherein a setting value candidate acquisition unit 77 is provided in control device 70, and the aforesaid multiple selectable setting values, i.e. information of eluents selectable with eluent switching valves 13 and 17 and information on columns selectable with channel switching valve 43, is automatically acquired by setting value candidate acquisition unit 77 via system controller 60.

The mode of embodying the present invention was described above using examples of embodiment, but the present invention is not limited to the above examples of embodiment, and suitable modifications are allowed within the scope of the gist of the present invention. For example, in the above examples of embodiment, a liquid chromatograph using a mixture of two types of eluents A and B was used as an example, but the present invention can also be applied to a liquid chromatograph which only uses one type of eluent without using the mixture of eluents. In this case, a configuration is employed which allows switching the eluent to be used as said one type of eluent among multiple types, and it is made possible to designate the type of the eluent and/or the type of column in the analysis schedule table.

Furthermore, the above example of embodiment was an example in which the present invention was applied to a liquid chromatograph, but the present invention can also be applied to control devices of other analytical equipment, such as gas chromatographs. It will be noted that when making a control device for a gas chromatograph, it is desirable to allow the type of carrier gas to be designated instead of eluent in the analysis schedule table.

Furthermore, in the above example of embodiment, the analytical parameter file to be used for each analysis was designated in the analysis schedule table, but in cases where only one analytical parameter file is stored in the analytical parameter file storage means and said one analytical parameter file is applied to all the analyses specified in the analysis schedule table, it is not always necessary to designate the analytical parameter file name in the analysis schedule table. In this case, if the analytical parameter file name has not been specified in the analysis schedule table, the analysis control means automatically applies the aforementioned one analytical parameter file to all of the aforementioned analyses.

EXPLANATION OF REFERENCES

10 . . . Liquid feed unit
11a, 11b, 15a, 15b . . . Eluent container
12, 16 . . . Degasser
13, 17 . . . Eluent switching valve
14, 18 . . . Liquid feed pump
19 . . . General purpose analytical gradient mixer
20 . . . High speed analytical gradient mixer
21, 43 . . . Channel switching valve
30 . . . Autosampler
40 . . . Column oven
41 . . . General purpose analytical column
42 . . . High speed analytical column
50 . . . Detection unit
51 . . . PDA detector
52 . . . Mass spectrometer
60 . . . System controller
70 . . . Control device
71 . . . Storage unit
72 . . . Analysis schedule table generating unit
73 . . . Analysis control unit
74 . . . Data processing unit
75 . . . Manipulation unit
76 . . . Display unit
77 . . . Setting value candidate acquisition unit

What is claimed is:

1. A device for automatic analysis, comprising:
a chromatograph including at least one column that separates components of at least one sample, at least one mobile phase that carries the at least one sample, and a detector that detects the separated components, the chromatograph configured to successively execute multiple analyses on the at least one sample, each of the multiple analyses including separating and detecting the components of the at least one sample; and
a control unit configured to control the operation of the chromatograph according to a preset analysis schedule table, the control unit comprising:
a) an analytical parameter file storage which stores a plurality of analytical parameter files, each of the plurality of analytical parameter files specifying a plurality of setting items relating to control of the chromatograph in a respective one of the multiple analyses, the plurality of setting items including a first setting item;
b) an analysis schedule table generator configured to generate an analysis schedule table which includes for each of the multiple analyses at least identification information for:
a sample to be analyzed from the at least one sample; and
an analytical parameter file from the plurality of analytical parameter files, the analytical parameter file including a setting value for the first setting item; and
c) an analysis controller configured to control operation of said chromatograph according to said analysis schedule table, wherein:
the analysis controller determines whether the analysis schedule table further includes a setting value for the first setting item separate from the analytical parameter file for an analysis of the chromatograph, and
in response to a determination that the analysis schedule table includes the setting value for the first setting item separate from the analytical parameter file, said analysis controller applies the setting value for the first setting item separate from the analytical parameter file included in the analysis schedule table to the analysis of the chromatograph,
wherein the first setting item is one of a column or a mobile phase, and wherein a configuration of the chromatograph for the analysis of the chromatograph is modified based on the setting value applied for the first setting item that is separate from the analytical parameter file and the chromatograph carries the sample to be analyzed by a mobile phase of the at least one mobile phase and separates the components of the sample to be analyzed by carrying the sample to be analyzed within a column of the at least one column based on the modified configuration of the chromatograph.

2. The automatic analysis device as described in claim 1, wherein the control unit further comprises:
d) a setting value candidate acquirer configured to acquire one or more selectable setting values for at least one setting item selected from among said plurality of setting items, the at least one setting item being described in said analysis schedule table,
wherein said analysis schedule table generator is configured to automatically generate said analysis schedule table, said analysis schedule table covering all combinations of setting value candidates acquired by said setting value candidate acquirer.

3. The automatic analysis device as described in claim 1, wherein the analysis controller applies the setting value for the first setting item included in the analytical parameter file to the respective analysis of the chromatograph in response to a determination that the analysis schedule table does not include any setting value for the first setting item separate from the analytical parameter file.

4. The automatic analysis device as described in claim 1, further comprising a display configured to display the analysis schedule table.

5. The automatic analysis device as described in claim 4, further comprising an operation manipulation unit configured to receive an input of the setting value for the first setting item on the displayed analysis schedule table.

6. A non-transitory computer readable medium including a program used in a computer for causing a chromatograph to successively perform multiple analyses on at least one sample by controlling the operation of the chromatograph according to a preset analysis schedule, the chromatograph including at least one column that separates components of the at least one sample, at least one mobile phase that carries the at least one sample, and a detector that detects the separated components, each of the multiple analyses including separating and detecting the components of the at least one sample, the program causes the computer to provide the following method:
a) storing a plurality of analytical parameter files by an analytical parameter file storage, each of the plurality of analytical parameter files specifying a plurality of setting items relating to control of the chromatograph in a respective one of the multiple analyses, the plurality of setting items including a first setting item;
b) generating an analysis schedule table which includes for each of the multiple analyses at least identification information for:
a sample to be analyzed from the at least one sample; and
an analytical parameter file from the plurality of analytical parameter files, the analytical parameter file including a setting value for the first setting item; and
c) controlling the operation of said chromatograph according to said analysis schedule table, wherein:
it is determined whether the analysis schedule table further includes a setting value for the first setting item separate from the analytical parameter file for a an analysis of the chromatograph, and
in response to a determination that the analysis schedule table includes the setting value for the first setting item separate from the analytical parameter file, the setting value for the first setting item separate from the analytical parameter file included in the analysis schedule table is applied to the analysis of the chromatograph,
wherein the first setting item is one of a column or a mobile phase, and
wherein a configuration of the chromatograph for the analysis of the chromatograph is modified based on the setting value applied for the first setting item that is separate from the analytical parameter file and the chromatograph carries the sample to be analyzed by a mobile phase of the at least one mobile phase and separates components of the sample to be analyzed by carrying the sample to be analyzed within a column of the at least one column based on the modified configuration of the chromatograph.

7. The non-transitory computer readable medium of claim 6, wherein in response to a determination that the analysis schedule table does not include any setting value for the first setting item separate from the analytical parameter file, the setting value for the first setting item included in the analytical parameter file is applied to the respective analysis of the chromatograph.

8. A method for causing a chromatograph to successively perform multiple analyses on at least one sample by controlling the operation of the chromatograph according to a preset analysis schedule, the chromatograph including at least one column that separates components of the at least one sample, at least one mobile phase that carries the at least one sample, and a detector that detects the separated components, each of the multiple analyses including separating and detecting the components of the at least one sample, the method comprising:
a) storing a plurality of analytical parameter files by an analytical parameter file storage, each of the plurality of analytical parameter files specifying a plurality of setting items relating to control of the chromatograph in a respective one of the multiple analyses, the plurality of setting items including a first setting item;
b) generating an analysis schedule table which includes for each of the multiple analyses at least identification information for:
a sample to be analyzed from the at least one sample; and
an analytical parameter file from the plurality of analytical parameter files, the analytical parameter file including a setting value for the first setting item; and
c) controlling the operation of said chromatograph according to said analysis schedule table, wherein:
it is determined whether the analysis schedule table further includes a setting value for the first setting item separate from the analytical parameter file for an analysis of the chromatograph, and
in response to the analysis schedule table includes the setting value for the first setting item, the setting value for the first setting item separate from the analytical parameter file, the setting value for the first setting item separate from the analytical parameter file included in the analysis schedule table is applied to the analysis of the chromatograph,
wherein the first setting item is one of a column or a mobile phase, and wherein a configuration of the chromatograph for the analysis of the chromatograph is modified based on the setting value applied for the first setting item that is separate from the analytical parameter file and the chromatograph carries the sample to be analyzed by a mobile phase of the at least one mobile phase and separates the components of sample to be analyzed by carrying the sample to be analyzed within a column of the at least one column based on the modified configuration of the chromatograph.

9. The method of claim 8, wherein in response to a determination that the analysis schedule table does not include the setting value for the first setting item separate from the analytical parameter file, the setting value for the first setting item included in the analytical parameter file is applied to the respective analysis of the chromatograph.

\* \* \* \* \*